Feb. 9, 1943.　　　P. MILLER ET AL　　　2,310,305
METHOD AND MEANS FOR PURIFYING LUBRICANTS
Filed Dec. 31, 1937
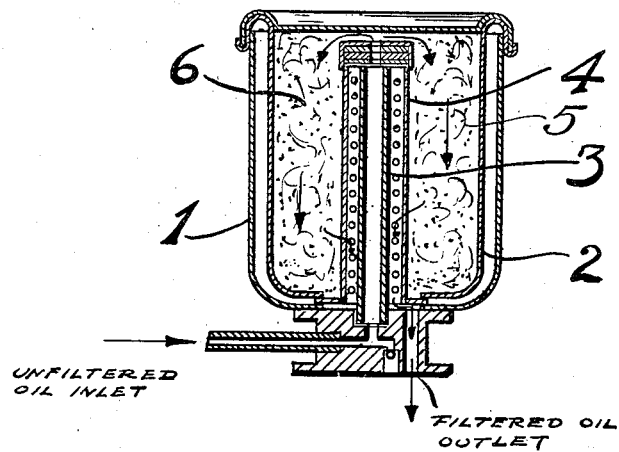

Patented Feb. 9, 1943

2,310,305

UNITED STATES PATENT OFFICE 2,310,305

METHOD AND MEANS FOR PURIFYING LUBRICANTS

Pharis Miller, Elizabeth, and Eugene Lieber, Linden, N. J., assignors to Standard Oil Development Company, a corporation of Delaware Application December 31, 1937, Serial No. 182,648

17 Claims. (Cl. 252—10)

The present invention relates to methods and means for purifying lubricating oils while maintaining therein a resistance to oxidation and decomposition during the period of their normal life. More specifically, this invention has to do with supplying addition agents of various types to lubricating oils to improve and preserve the oils by maintaining therein an adequate concentration of a substance capable of effecting resistance to oxidation and decomposition during the period of use. Particularly, the invention deals with the use of addition agents which are only slightly soluble in the oils with which they are used; and, further, the invention has to do with the treatment of lubricating oils, used in internal combustion engines, with small amounts of difficultly soluble addition agents added to the oils while in service, and in successive increments as required. Included in the concept is the use of conventional oil filter systems to accomplish the addition of the agents disclosed.

The invention may be fully understood from the following description and by reference to the accompanying drawing.

The filter shown is one such as is described in the United States Patent 1,914,999 granted to George M. Maverick and George L. Matheson, comprising an outer case 1, an inner case 2, an oil inlet line 3, adapted to admit oil to the inner case, and, concentric with the line 3, an oil outlet line 4. As described in the above mentioned patent, the case 2 is filled with a fibrous or filamentous filter material 5 such as wool, asbestos, artificially prepared mineral or glass wool or other similar material which has been previously impregnated or loaded with an inhibitor substance having only slight solubility in lubricating oils. The inhibitor is shown in the drawing as particles 6 dispersed throughout the mass of the filter material 5.

In use, lubricating oils and especially oils used for the lubrication of internal combustion engines are required to withstand severe temperature conditions. These conditions cause the more or less rapid formation of decomposition or oxidation products such as acids, sludge and the like. The formation of such products has been reduced, to some extent, by the use of addition agents which inhibit oxidation of the oils and reduce or delay sludge formation. While effective, these agents have been found to be the source of other difficulties.

Most of the addition agents normally used are consumed rapidly in service, and, that they may be effective during the entire normal use of an oil, it has been necessary to add an excess of the inhibiting substances in order that the point at which they have been completely consumed will substantially coincide with the point at which the oil will normally be replaced. However, it has been known that such "overcharging" of the oil with an inhibitor results in a tendency to accelerate sludge formation in the oil, as indicated by the results obtained by means of the "Sligh" test. On the other hand, if to avoid undue sludge formation, the original quantity of added inhibitor is decreased it has been found that the oil is apt to deteriorate very rapidly during the latter portion of its normal period of use. Of course the most desirable manner of adding inhibiting substances to an oil would be to adjust such addition, in quantity and time, to the actual condition of the oil while in use. In other words, as the inhibitor is consumed, more would be added and in the amount required. The difficulties involved in devising such methods and means, however, have thus far prevented the development of any convenient system of accomplishing such a procedure.

Now, according to the present invention, it is proposed to utilize those substances previously considered unsuitable for use as inhibiting agents, because of their low solubility in oil, to accomplish the desirable procedure of maintaining the resistance of oils to decomposition or oxidation during use, without the necessity for "overcharging" or for any complicated systems, mechanical or otherwise.

There are available, a great number of materials which have been discovered to have a beneficial action in retarding the decomposition of oils in service, but which are only slightly soluble in such oils even at the temperatures to which the oils are raised during use. These substances have previously been discarded as unsuitable as addition agents, by reason of their nature, but by the present invention they may be utilized with facility and benefit. Among the materials now found to be useful are included those substituted aromatic materials, having only slight solubility at the operating temperatures of the oils, such as the sulfur-containing phenolic substitutes, and particularly the unalkylated materials such as diphenol-disulfide and diphenyl sulfide. In addition, the phenyl mercaptans and polysulfides are useful as well as the corresponding naphthol, anthrol and phenanthrol compounds. Such substances as sulfurized wood creosote, sulfurized cresols and thiophenylbetanaphylamine, may also be employed, as well as slightly oil soluble metallic soaps and other metallo-organic compounds for improving engine performance.

The technique of utilization of these agents, as now discovered is to provide a reservoir of the additive material through which will flow a considerable portion of oil drawn from the point or points of use and which oil is thereby renewed in its ability to resist oxidation and decomposition. Accordingly, renewal of the inhibitor content of the oil takes place automatically and in accordance with the particular requirements of the oil at any given time. Due to the nature of the inhibitor used, the oil is capable of dissolving only a certain amount at any degree of temperature and if the inhibitor content is at a maximum on entering the reservoir no further quantity can be dissolved. Likewise, if the content is below a maximum the oil will then take up from the material in the reservoir such quantities as will substantially effect saturation. In this fashion the resistance of the oil to decomposition is maintained at an optimum during its entire life without the "overcharging" formerly necessary and without causing either acceleration of sludge formation or sudden failure of the oil due to exhaustion of the inhibitor substance.

Although the reservoir for the addition agent may be provided as a separate installation, it has been found to be most convenient to enlarge the function of the conventional oil filter assembly, now in common use, by utilizing its available reservoir capacity. Such filters as may be used in this manner are well known in the art, including those types disclosed by United States Patents 2,071,529 and 2,071,550. Provision is made in such filters for a removable or a refillable cartridge of porous of fibrous material such as activated clay, cotton, asbestos or glass wool, or materials of the type described in United States Patent 1,914,999. In such adaptation of existing facilities the material comprising the cartridge may be "loaded" with fine particles of an inhibitor substance, or the material of the cartridge may be coated with such a substance. Alternatively or in conjunction with these methods, a slug, a solid, a semi-solid or a porous mass of the material itself or of an inhibitor impregnated material may be disposed in the filter chamber in such manner as to be continuously contacted by oil passing through the chamber.

Proceeding in accordance with the disclosure as set forth above, tests have been made to determine the effectiveness of the application of the system contemplated. These tests were made on two portions of an oil comprising the drainings collected from the crankcases of a number of automobile engines. Each of the two portions used was circulated through a conventional type oil filter packed with cotton waste. The circulation of each portion through the filter was continued for a period of three hours while maintaining on the oil, a pressure of 20 pounds per square inch and a temperature therein of 200° F. The system was cleaned between runs. In the first run the filter was packed with cotton waste alone while in the second run 10 grams of phenol sulfide were distributed through the waste as the filter was packed.

The filtered oils obtained from each run were then subjected to the following tests:

1. The determination of lead tolerance by the "Underwood method," and reported as a lead number for the oil, indicating the tendency of the oil to corrode metal.
2. The determination of color by means of the Tag-Robinson colorimeter.
3. The determination of acid number in accordance with the procedure set forth by A. S. T. M. test D–188–27T.
4. The determination of saponification number in accordance with the procedure set forth by A. S. T. M. test D–94–36.
5. The determination of oxygen adsorption rate by bubbling oxygen gas through 10 grams of oil maintained at a temperature of 200° C. in a closed system under atmospheric pressure the volume of oxygen adsorbed being measured at 15 minute intervals.

The result of these tests are reported in the following tabulation.

| Test | Original oil | First run | Second run |
| --- | --- | --- | --- |
| 1. Lead tolerance | Less than 0 | 0.010 | 0.040+ |
| 2. Color | | −¼ | ¼ |
| 3. Acid No | 0.83 | 0.69 | 0.56 |
| 4. Saponification No | 2.9 | 1.91 | 1.53 |
| 5. Cc. of oxygen adsorbed | | 133, 67 | 65, 50, 43 |

The lead number reported is a percentage figure indicating the amount by weight of lead oleate (calculated as lead oxide) which may be absorbed by an oil, in successive increments, before a metal against which it is discharged continuously, shows a loss of weight equal to 50 milligrams. With a fresh oil a lead tolerance below 0.020 is considered unsatisfactory. Attention is directed therefore to the high lead tolerance of the used oil after filter treatment and contact with the type of inhibitor material disclosed. Comparison is also made with the lead tolerance of the oil subjected to filtering alone.

The foregoing description and the specific examples given are for the sole purpose of providing an understanding of the invention, which is not to be limited in any manner thereby, but only by the appended claims in which it is intended to claim all novelty inherent in the invention, as broadly as the prior art permits.

We claim:

1. A method for maintaining and improving the quality of a lubricating oil during service comprising circulating at least a portion of said oil through an addition agent reservoir containing a supply of slightly oil-soluble improving agent in undissolved form having oxidation inhibiting properties, whereby said oil contacts at least a portion of said improving agent and dissolves a small amount thereof, and recirculating said treated oil into service.

2. A method for inhibiting oxidation of a lubricating oil in service comprising circulating successive portions of said oil through a filter mechanism containing an oxidation inhibiting substance having a low limit of solubility in said oil, said inhibitor being in undissolved form so that it is gradually added to the oil as the oil circulates through the filter.

3. A method according to claim 2 in which the inhibitor is a phenolic material.

4. A method according to claim 2 in which the substance inhibiting oxidation is phenol disulphide.

5. A method according to claim 2 in which the inhibitor is a substituted aromatic material.

6. A method according to claim 2 in which the inhibitor is an aromatic sulphur compound.

7. A method according to claim 2 in which the inhibitor is a metallo organic derivative.

8. A method according to claim 2 in which the inhibitor is an oil-improving metal soap.

9. An article of manufacture for insertion into a lubricating oil system for improving and maintaining the quality of lubricating oils during service which comprises a container provided with an inlet and an outlet for oil and containing between said inlet and outlet a supply of slightly oil-soluble improving agent in undissolved form which will dissolve sufficiently in the oil during service to inhibit decomposition thereof.

10. As a new article of manufacture, an oil filter for use in purifying and inhibiting oxidation and decomposition of internal combustion engine crankcase lubricants during service, which comprises a container provided with an inlet and an outlet for oil and containing between said inlet and outlet a packed filtering medium having dispersed therethrough, particles of a slightly oil-soluble oxidation inhibitor in undissolved form which will dissolve in sufficient amount in the oil during service to maintain its resistance to oxidation and decomposition during service, without at any time causing a substantial excess of antioxidant to be present in solution in the oil over that required to prevent oxidation.

11. A filter cartridge for internal combustion engine crankcase oil filters having replaceable filter elements, comprising a bed of packed fibrous filter medium having dispersed therethrough a slightly oil-soluble oil-improving agent in undissolved form which will dissolve in the crankcase oil during service to inhibit decomposition thereof.

12. A method for purifying and inhibiting oxidation and decomposition of a lubricating oil during service which comprises circulating at least a portion of said oil through a filter element packed with a fibrous filter medium having dispersed therethrough particles of a slightly oil-soluble inhibitor in undissolved form, whereby said inhibitor is gradually added to the oil as the oil circulates through the filter, and recirculating said treated oil into service.

13. Process according to claim 12 in which the filter element comprises phenol sulfide distributed through a bed of cotton waste, and in which the oil is circulated through said filter at a pressure of about 20 lbs. per sq. in. and a temperature of about 200° F.

14. The method of maintaining an effective concentration of a lubricating oil addition agent in solution in lubricating oil during use in a lubricating oil circulating system, which comprises contacting said oil with an organic addition agent soluble in said oil in relatively low concentrations while circulating said oil through said lubricating oil system.

15. The method of purifying engine lubricating oil and maintaining an effective concentration of a lubricating oil addition agent in solution in the oil during use in an internal combustion engine, which comprises passing said oil through a porous filtering material and contacting the filtered oil with an organic addition agent soluble in said oil in relatively low concentrations while circulating said oil through the lubricating oil system of said engine.

16. Method according to claim 14 in which the lubricating oil addition agent is an oxidation inhibitor.

17. Method according to claim 14 in which the oil is contacted with the organic addition agent by passing the oil through a porous material having the lubricating oil addition agent dispersed therethrough.

PHARIS MILLER.
EUGENE LIEBER.